US010395785B2

(12) United States Patent
Nguyen

(10) Patent No.: US 10,395,785 B2
(45) Date of Patent: Aug. 27, 2019

(54) TRANSPORTABLE MONITORING SYSTEM

(71) Applicant: NuScale Power, LLC, Corvallis, OR (US)

(72) Inventor: Ky Duc Nguyen, Newport Beach, CA (US)

(73) Assignee: NUSCALE POWER, LLC, Corvallis, OR (US)

( * ) Notice: Subject to any disclaimer, the term of this patent is extended or adjusted under 35 U.S.C. 154(b) by 650 days.

(21) Appl. No.: 14/712,507

(22) Filed: May 14, 2015

(65) Prior Publication Data

US 2015/0332794 A1 Nov. 19, 2015

Related U.S. Application Data

(60) Provisional application No. 62/000,452, filed on May 19, 2014.

(51) Int. Cl.

| | |
|---|---|
| ***G21D 3/10*** | (2006.01) |
| ***G21C 17/00*** | (2006.01) |
| ***G21C 17/01*** | (2006.01) |
| ***G21C 17/02*** | (2006.01) |
| ***G21C 17/06*** | (2006.01) |

(Continued)

(52) U.S. Cl.

CPC ........... *G21C 17/013* (2013.01); *G21C 17/00* (2013.01); *G21C 17/003* (2013.01); *G21C 17/007* (2013.01); *G21C 17/01* (2013.01); *G21C 17/02* (2013.01); *G21C 17/022* (2013.01); *G21C 17/06* (2013.01); *G21C 17/104* (2013.01); *G21C 17/108* (2013.01); *G21C 17/112* (2013.01);

(Continued)

(58) Field of Classification Search

CPC ..... G21C 17/044; G21C 17/108; G21C 17/10
USPC ................. 376/254, 249, 240, 258; 340/815
See application file for complete search history.

(56) References Cited

U.S. PATENT DOCUMENTS 3,930,942 A * 1/1976 Thome .................. B65D 90/24 376/463
5,078,957 A * 1/1992 Tower .................. G21C 17/10 376/245

(Continued)

FOREIGN PATENT DOCUMENTS

| | | |
|---|---|---|
| CN | 87108015 | 6/1988 |
| CN | 1684203 | 10/2005 |

(Continued)

OTHER PUBLICATIONS

NuScale Power, LLC, "NuScale Plant Design Overview", Rev. 0, Aug. 2012.*
Listing of Related Cases, Dec. 3, 2015.

*Primary Examiner* — Jack W Keith
*Assistant Examiner* — Sandra Herrick
(74) *Attorney, Agent, or Firm* — Schwabe Williamson & Wyatt

(57) ABSTRACT

A system for monitoring a reactor module housed in a reactor bay may include a mounting structure and one or more extendable attachment mechanisms connected to the mounting structure. Additionally, one or more monitoring devices may be operably coupled to the one or more extendable attachment mechanism, and the one or more extendable attachment mechanisms may be configured to selectively position the one or more monitoring devices at varying distances from a wall of the reactor bay to place the one or monitoring devices in proximity to the reactor module.

18 Claims, 10 Drawing Sheets

(51) Int. Cl.

| | |
|---|---|
| ***G21C 19/20*** | (2006.01) |
| ***G21C 17/003*** | (2006.01) |
| ***G21C 17/007*** | (2006.01) |
| ***G21C 17/013*** | (2006.01) |
| ***G21C 17/022*** | (2006.01) |
| ***G21C 17/104*** | (2006.01) |
| ***G21C 17/108*** | (2006.01) |
| ***G21C 17/112*** | (2006.01) |
| ***G21C 19/07*** | (2006.01) |
| ***G21C 19/40*** | (2006.01) |
| ***G21C 19/34*** | (2006.01) |

(52) U.S. Cl.

CPC ............... *G21C 19/20* (2013.01); *G21D 3/10* (2013.01); *Y02E 30/40* (2013.01)

(56) References Cited

U.S. PATENT DOCUMENTS

| | | | | | |
|---|---|---|---|---|---|
| 5,141,709 | A * | 8/1992 | Gaussa, Jr. | G01T 3/00 | 250/390.01 |
| 5,156,803 | A | 10/1992 | Engding et al. | | |
| 5,295,167 | A * | 3/1994 | Burner | G21C 19/207 | 376/260 |
| 5,652,396 | A | 7/1997 | Gill | | |
| 5,844,956 | A | 12/1998 | Schramm | | |
| 8,681,920 | B2 * | 3/2014 | Heibel | G21C 17/10 | 340/870.01 |
| 8,946,645 | B2 * | 2/2015 | De Volpi | G01T 3/06 | 250/370.09 |
| 9,058,905 | B2 * | 6/2015 | Olsen | G21C 17/013 | |
| 9,324,465 | B2 | 4/2016 | Splichal, Jr. | | |
| 10,102,934 | B2 * | 10/2018 | Izumi | G21C 17/035 | |
| 2004/0129088 | A1 | 7/2004 | Moscaritolo | | |
| 2005/0013401 | A1 * | 1/2005 | Markling | G21C 17/00 | 376/263 |
| 2009/0090194 | A1 | 4/2009 | Feller | | |
| 2012/0027155 | A1 * | 2/2012 | Kamath | G21C 11/00 | 376/263 |
| 2012/0150413 | A1 | 6/2012 | Bunce | | |
| 2013/0329848 | A1 * | 12/2013 | Linnebur | G21C 17/013 | 376/249 |
| 2014/0020478 | A1 | 1/2014 | Ao | | |
| 2014/0123768 | A1 | 5/2014 | Ao | | |
| 2014/0270038 | A1 * | 9/2014 | Delaune | G21C 17/003 | 376/249 |
| 2015/0020608 | A1 | 1/2015 | Chevrier | | |
| 2015/0211905 | A1 | 7/2015 | Drachmann | | |
| 2015/0233747 | A1 | 8/2015 | Mitri | | |
| 2015/0367507 | A1 * | 12/2015 | Egawa | G21D 1/003 | 248/327 |
| 2016/0094761 | A1 * | 3/2016 | Okada | G21C 17/00 | 348/82 |
| 2017/0186504 | A1 * | 6/2017 | Morrison | G21C 17/007 | |

FOREIGN PATENT DOCUMENTS

| | | |
|---|---|---|
| DE | 43 41 542 | 6/1995 |
| DE | 297 03 255 | 7/1998 |
| DE | 102 35 059 | 2/2001 |
| DE | 10 2008 013224 | 9/2009 |
| EP | 538930 | 4/1993 |
| EP | 2366979 | 9/2011 |
| EP | 2 738 372 | 6/2014 |
| FR | 2 947 091 | 12/2010 |
| WO | 92/15097 | 9/1992 |
| WO | 09/087280 | 7/2009 |

* cited by examiner

TRANSPORTABLE MONITORING SYSTEM

STATEMENT OF RELATED MATTERS

This application claims priority to U.S. Provisional Patent Application No. 62/000,452 filed on May 19, 2014, the contents of which are incorporated by reference herein.

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for monitoring a nuclear power reactor.

BACKGROUND

In a nuclear reactor, a core of nuclear material may be confined to a relatively small volume internal to the reactor so that a reaction may occur. A controlled nuclear reaction may persist for an extended period of time, which may include several years, before refueling of the reactor core is required. Accordingly, when used as a source of heat for converting water into steam, a properly designed nuclear reactor may provide a carbon-free, stable, and highly reliable source of energy.

During operation of a nuclear reactor, one or more sensors may be used to measure a neutron flux associated with a neutron source and/or with neutrons generated through fission events in the reactor core. Similarly, it may be useful to monitor the temperature, pressure, coolant level, power level, and/or coolant flow rate within the reactor module to ensure that all aspects of the reactor's internal operation are maintained within acceptable limits. For example, in the event that the flow of coolant is too low, components within the reactor may undergo excessive heating, which may result in the failure of one or more reactor components. In the event that the flow of coolant is too high, the reactor core may experience an undue level of cooling, which may result in undesirable fluctuations of reactor output power levels.

Temperatures and potentially corrosive characteristics of coolant located near the reactor core and/or otherwise located within the reactor module may cause sensors, gauges, and/or other types of measurement devices to fail over a period of time. Additionally, shutting down the reactor to replace and/or repair the failed measurement devices may result in significant operational costs and ultimately a less efficient and less reliable source of energy.

Periodically, a reactor module may need to be refueled, serviced, and/or inspected. Certain types of reactor modules may be removed from the reactor bay and replaced with a new reactor module. In addition to the number of sensors that may be used to monitor various characteristics of the reactor module, additional components, fittings, attachments, piping, wiring, supports, etc. that may be attached, connected to, or otherwise placed in communication with the rector module may impede the ability to gain access to and/or to service the reactor module. Similarly, it may take a significant amount of time to connect and disconnect the various components from the reactor module, such as during installation of the reactor module and removal of the reactor module, respectively. Furthermore, any penetrations into a reactor vessel and/or containment vessel that are made to accommodate the various components may provide potential leakage points and/or areas of structural weakness in the reactor module.

This application addresses these and other problems.

SUMMARY

A system for monitoring a reactor module housed in a reactor bay may include a mounting structure and one or more extendable attachment mechanisms connected to the mounting structure. Additionally, one or more monitoring devices may be operably coupled to the one or more extendable attachment mechanism, and the one or more extendable attachment mechanisms may be configured to selectively position the one or more monitoring devices at varying distances from a wall of the reactor bay to place the one or monitoring devices in proximity to the reactor module.

One or more monitoring devices may be located in a reactor bay during a monitoring operation. In some examples, the one or more monitoring devices may be completely submerged in a pool of water contained within the reactor bay. The one or more monitoring devices may be extended from a retracted position near a wall of the reactor bay to an extended position near the reactor module. The one or more monitoring devices may be configured to monitor the reactor module in the extended position. Additionally, the one or more monitoring devices may be retracted to the retracted position after completing the monitoring operation.

A system comprising a transportable monitoring device may be configured to monitor one or more neutron sources. In other examples, a system comprising a transportable monitoring device may be configured to monitor a flow rate of primary coolant contained within the reactor module. One or more signal path devices may be configured to enhance, augment, multiply, and/or otherwise increase a signal that may be detected at one or more of the monitoring devices.

DETAILED DESCRIPTION

Various examples disclosed and/or referred to herein may be operated consistent with, or in conjunction with, one or more features found in U.S. Pat. No. 8,687,759, entitled Internal Dry Containment Vessel for a Nuclear Reactor, U.S. Pat. No. 8,588,360, entitled Evacuated Containment Vessel for a Nuclear Reactor, U.S. application Ser. No. 14/242,677, entitled Neutron Path Enhancement, and/or U.S. Provisional Application No. 62/021,627, entitled Flow Rate Measurement in a Volume, the contents of which are incorporated by reference herein.

Figure 1:
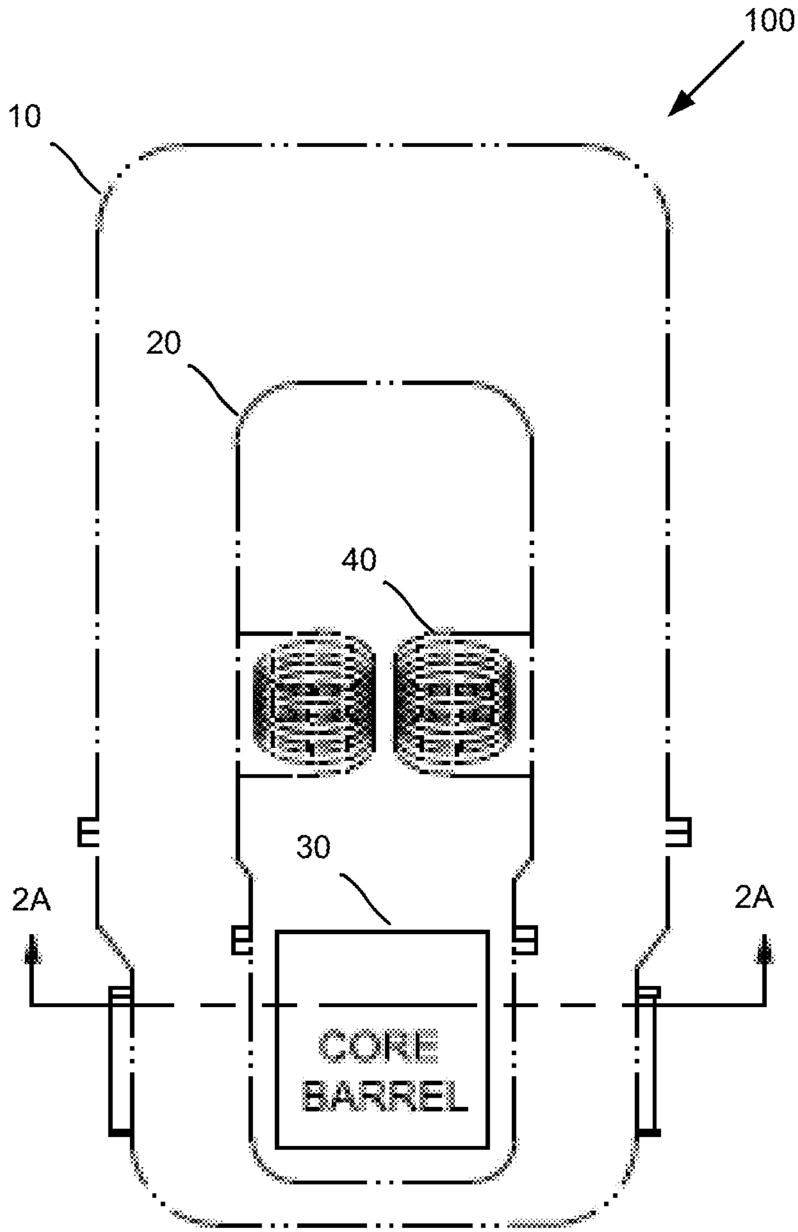
FIG. 1 illustrates a cross sectional side view of an example reactor module comprising a reactor vessel housed in a containment vessel.

FIG. 1 illustrates a cross sectional side view of an example reactor module 100 comprising a reactor vessel 20 housed in a containment vessel 10. A reactor core 30 is positioned at a bottom portion of a cylinder-shaped or capsule-shaped reactor vessel 20. Reactor core 30 may comprise a quantity of fissile material that generates a controlled reaction that may occur over a period of perhaps several years. In some examples, one or more control rods may be employed to control the rate of fission within reactor core 30. The control rods may comprise silver, indium, cadmium, boron, cobalt, hafnium, dysprosium, gadolinium, samarium, erbium, europium, other types of materials, and any combination thereof, including alloys and compounds.

Reactor core 30 may be partially or completely submerged within a coolant or fluid, such as water, which may include boron or other additives. The coolant rises after making contact with a surface of the reactor core 30 and removing heat there from. The coolant travels upward through one or more heat exchangers 40 thus allowing the coolant to impart the heat removed from the reactor core 30 to the heat exchangers 40. In some examples, the coolant travels at a flow rate within the reactor vessel due to natural circulation as the coolant is alternately heated and cooled at different elevations as it circulates within the reactor vessel. The flow rate of the coolant may vary during different modes of operation of the reactor module 100, such as reactor initialization, full power, and shutdown.

In some examples, coolant within reactor vessel 20 remains at a pressure above atmospheric pressure, thus allowing the coolant to maintain a high temperature without vaporizing (i.e. boiling). As coolant within the one or more heat exchangers 40 increases in temperature, the coolant may begin to boil. As boiling commences, vaporized coolant may be routed from a top portion of heat exchangers 40 to drive one or more of turbines. The turbines may be configured to convert the thermal potential energy of steam into electrical energy.

Containment vessel 10 may be approximately cylindrical in shape. In some examples, containment vessel 10 may be cylinder-shaped or capsule-shaped, and/or have one or more ellipsoidal, domed, or spherical ends. Containment vessel 10 may be welded or otherwise sealed to the environment, such that liquids and/or gases are not allowed to escape from, or enter into, containment vessel 10. In various examples, reactor vessel 20 and/or containment vessel 10 may be bottom supported, top supported, supported about its center, or any combination thereof.

In some examples and/or modes of operation of the reactor module 100, containment vessel 10 may be partially or completely submerged within a pool of water or other fluid. The volume between reactor vessel 20 and containment vessel 10 may be partially or completely evacuated to reduce heat transfer from reactor vessel 20 to the external environment. However, in other examples and/or modes of operation of the reactor module 100, the volume between reactor vessel 20 and containment vessel 10 may be at least partially filled with a gas and/or a fluid that increases heat transfer between the reactor vessel and the containment vessel.

Containment vessel 10 may substantially surround the reactor vessel 20 within a containment region. The containment region may comprise a dry, voided, and/or gaseous environment in some examples and/or modes of operation. The containment region may comprise an amount of air, a noble gas such as Argon, other types of gases, or any combination thereof. Any gas or gasses in containment vessel 20 may be evacuated and/or removed prior to operation of reactor module 100.

An inner surface of reactor vessel 20 may be exposed to a wet environment comprising coolant and/or vapor, and an outer surface of reactor vessel 20 may be exposed to a substantially dry environment. The reactor vessel 20 may comprise and/or be made of stainless steel, carbon steel, other types of materials or composites, or any combination thereof. Additionally, reactor vessel 20 may include cladding and/or insulation.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, the containment region may be provided with, or maintained below, a pressure of 300 torr (300 mmHG). In other examples, the containment region may be provided with, or maintained below, a pressure of 50 torr (50 mmHG).

The containment region may be provided with and/or maintained at a pressure level which substantially inhibits all convective and/or conductive heat transfer between reactor vessel 20 and containment vessel 10. A complete or partial vacuum may be provided and/or maintained by operating a vacuum pump, steam-air jet ejector, other types of evacuation devices, or any combination thereof. By maintaining the containment region in a vacuum or partial vacuum, moisture within the containment region may be eliminated, thereby protecting electrical and mechanical components from corrosion or failure.

Neutrons generated at or near reactor core 30 may comprise fast neutrons, slow neutrons, thermal neutrons, or any combination thereof. A neutron source may be used to provide a stable and reliable source of neutrons for the initiation of a nuclear chain reaction, for example when the reactor includes new fuel rods whose neutron flux from spontaneous fission may otherwise be insufficient for purposes of reactor startup. Additionally, the neutron source may be configured to provide a constant number of neutrons to the nuclear fuel during startup or when restarting the reactor after being shutdown (e.g., for maintenance and/or inspection).

In some examples, the power level of the reactor may be inferred, at least in part, from the number of neutrons that are emitted from the neutron source and/or additional neutrons that are generated as a result of a subcritical multiplication process in the reactor core 30 that may occur in response to the emission of neutrons by the neutron source.

In examples in which containment vessel 10 is at least partially submerged in a pool of water, access to the portion of containment vessel 10 which surrounds reactor core 30 may be under water. For that matter, the entire reactor vessel 20 may be situated under the top surface of the pool of water.

Wires, power cords, and/or other devices may penetrate through a top head of containment vessel 10, such that any penetrations through containment vessel are located above the top surface of the pool of water.

Figure 2:
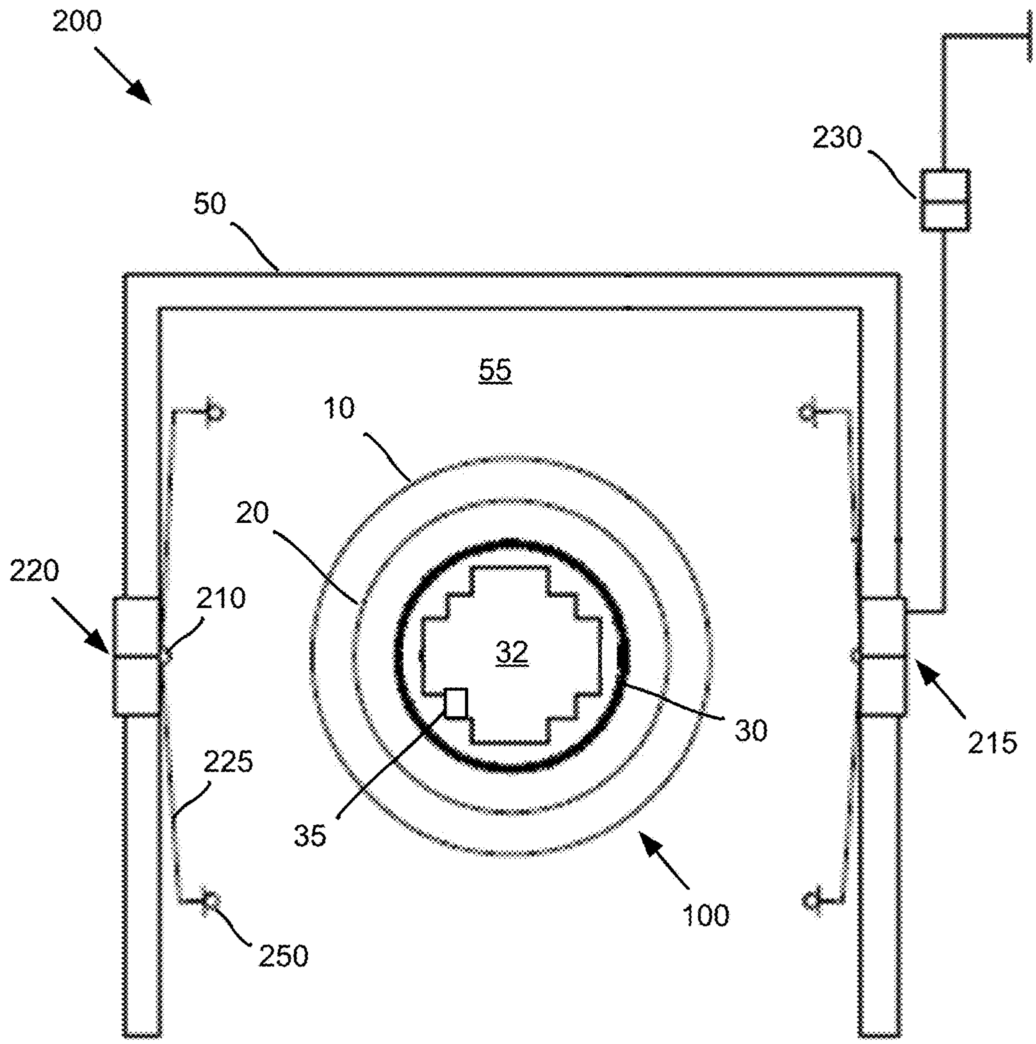
FIG. 2 illustrates a cross-sectional top view of an example system for monitoring a nuclear reactor module, shown in a retracted position.

FIG. 2 illustrates a cross-sectional top view of an example system 200 for monitoring a reactor module, shown in an inactive, or retracted position. In some examples, FIG. 2 may be understood as illustrating a top view of the reactor module 100 of FIG. 1 taken through cross-section 2A-2A at or near the reactor core 30. In other examples, the top view may comprise a cross-sectional view taken at a different elevation, such as at or near steam generator 40 (FIG. 1), above steam generator 40, or between steam generator 40 and reactor core 30.

Containment vessel 10 may be placed, at least partially, in a pool of water 55, for example as located below ground level. The pool of water 55 may be stored in a reactor bay 50 comprising a plurality of walls. In some examples, reactor bay 50 may comprise four walls. In other examples, reactor bay 50 may be part of a facility comprising a number of interconnected reactor bays, where each bay may have fewer than four walls so as to provide passageway between adjacent bays and/or for purposes of moving a reactor module during installation, refueling, or maintenance. Containment vessel 10 may be configured to prohibit the release of coolant associated with reactor vessel 20 to escape outside of containment vessel 10 into the pool of water 55 and/or into the surrounding environment.

A neutron source 35 may be positioned so that the neutron flux it produces is detectable by reactor monitoring instrumentation. For example, neutron source 35 may be inserted in regularly spaced positions inside the reactor core 30, such as in place of one or more fuel rods of a fuel grid 32. When the reactor module 100 is shutdown, neutron source 35 may be configured to induce signals that may be detected by the reactor monitoring instrumentation. In some examples, the equilibrium level of neutron flux in a subcritical reactor may be dependent on the strength of neutron source 35. Neutron source 35 may be configured to provide a minimum level of neutron emissions to ensure that the reactor level may be monitored, such as during reactor startup.

System 200 may comprise one or more transportable apparatus 210. Apparatus 210 may be mounted on a wall of reactor bay 50. In some examples, transportable apparatus 210 may be mounted on a transport system 220 located on the wall of reactor bay 50. Transport system 220 may be configured to allow transportable apparatus 210 to travel within reactor bay 50, such as vertically and/or horizontally. System 200 may comprise one or more additional transportable apparatus and/or transport systems, such as a second transportable apparatus 215 located on an opposite wall of reactor bay 50 from transportable apparatus 210.

In some examples, one or more vertical tracks and/or horizontal tracks may be used to allow transportable apparatus 210 to move around the one or more walls of reactor bay 50, and about a circumference of containment vessel 10. Accordingly, transportable apparatus 210 may be moved to a plurality of locations within reactor bay 50 in order to provide for inspection of, and/or access to, some or all of the exterior surface of containment vessel 10.

Additionally, transportable apparatus 210 may be connected to a flexible cable and/or wire that moves, coils, retracts, and/or extends while transportable apparatus 210 is moved by transport system 220. Transport system 220 may comprise a track, a hoisting device, a winch, a pulley, a cable, a motor, one or more guide rails, wheels, or rollers, other transportation components, or any combination thereof.

Transportable apparatus 210 may comprise one or more monitoring devices, such as monitoring device 250, located on a mounting arm 225. Monitoring device 250 may comprise a sensor, a gauge, a transmitter, a receiver, a detector, a demodulator, a camera, an imaging device, an ultrasound device, other types of measurement devices and/or monitoring devices, or any combination thereof. Monitoring device 250 may be configured to measure, monitor, record, analyze, view, inspect, calculate, estimate, or otherwise determine one or more functions, characteristics, or other type of information associated with reactor module 100.

In some examples, monitoring device 250 may be configured to monitor a neutron flux associated with neutron source 35 and/or associated with neutrons generated within or near reactor core 30. In other examples, monitoring device 250 may be configured to measure a flow rate of coolant within reactor vessel 20. Other types of information that monitoring device 250 may be configured to monitor, measure, or determine include: temperature, pressure, humidity, chemical concentration levels, coolant levels, reactivity, power, heat, vibration, sound, toxicity, material hardness, images, or any combination thereof. In some examples, one or more cameras or imaging devices may be used to scan all or a portion of containment vessel 10.

Two apparatus, such as transportable apparatus 210 and second transportable apparatus 215, are shown as being located on opposite walls of reactor bay 50. Each transportable apparatus is additionally shown as having two mounting arms and two corresponding monitoring devices located on the ends of the mounting arms. Mounting arm 225 is shown in a retracted position. In the retracted position, monitoring device 250 may be located near the wall of the reactor bay 50, some distance away from containment vessel 10. By selectively locating or moving monitoring device 250 specifically, and transportable apparatus 210 more generally, away from containment vessel 10, access to reactor module 100 may be facilitated, including any operations which may involve repositioning and/or moving reactor module 100 into or out of reactor bay 50.

System 200 may comprise a dry disconnect apparatus 230. Dry disconnect apparatus 230 may be connected to one or more transportable apparatus, such as transportable apparatus 210, second transportable apparatus 215, and/or to one or more monitoring devices associated with the transportable apparatus, such as monitoring device 250. In some examples, dry disconnect apparatus 230 may be located above pool of water 55, and configured to provide an electrical connection to the transportable apparatus and/or monitoring device. Additionally, dry disconnect apparatus 230 may be configured to communicatively connect the transportable apparatus and/or monitoring device to a processing device or control panel. In some examples, dry disconnect apparatus 230 may comprise a processing device, a wireless communication device, an alert system, a database, other monitoring devices, or any combination thereof.

Information that is measured, monitored, recorded, analyzed, viewed, inspected, calculated, estimated, or otherwise obtained by the monitoring device may be communicated to and/or through dry disconnect apparatus 230. For example, the information may be transmitted through dry disconnect apparatus 230 to a processing device for further evaluation. Each transportable apparatus 210, 215 may be associated with a separate dry disconnect apparatus. In some examples, dry disconnect apparatus 230 may be configured to be electrically and/or communicatively coupled with two or more transportable apparatus and/or monitoring devices.

Figure 3:
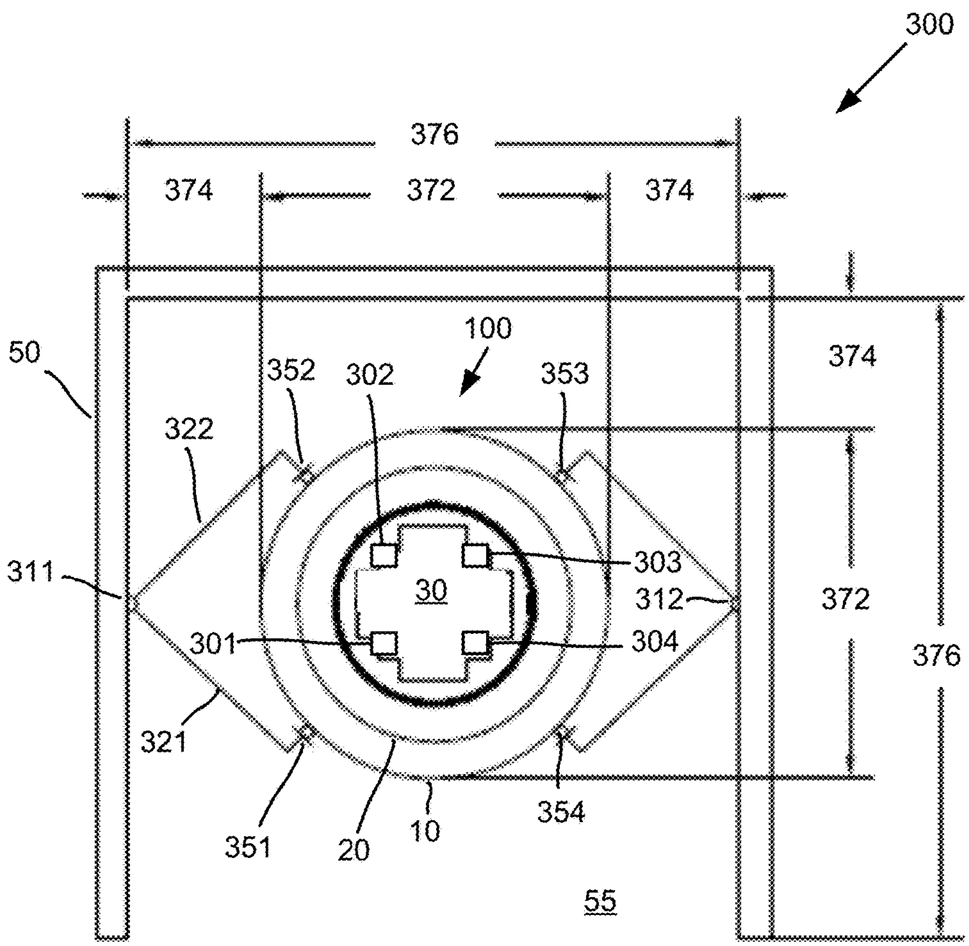
FIG. 3 illustrates an example system for monitoring a nuclear reactor module, shown in an extended position.

FIG. 3 illustrates an example system 300 for monitoring a nuclear reactor module 100, shown in an active, engaged, or extended position. One or more of the components, apparatus, and/or systems described with respect to system 300 may be configured similarly as system 200 of FIG. 2.

System 300 may comprise one or more transportable apparatus such as a first transportable apparatus 311 and a second transportable apparatus 312. First transportable apparatus 311 may be mounted on a first wall of reactor bay 50, and second transportable apparatus 312 may be mounted on a second wall of reactor bay 50. First transportable apparatus 311 may comprise a first monitoring device 351 and a second monitoring device 352. First monitoring device 351 and second monitoring device 352 may be attached to one or more arms, such as a first arm 321 and a second arm 322, respectively.

First arm 321 and second arm 322 may be pivotably attached to first transportable apparatus 311 by a hinge, a pivot, a joint, a gate, a swivel, other types of connections, or any combination thereof. In some examples, first arm 321 and second arm 322 may be configured to cause first monitoring device 351 and second monitoring device 352 to move from a retracted position, similar to that shown in FIG. 2, to an extended position as shown in FIG. 3. In the extended position, one or both of first monitoring device 351 and second monitoring device 352 may be located adjacent to, or in contact with, an exterior surface of containment vessel 10. Second transportable device 312, including a third monitoring device 353 and a fourth monitoring device 354, may be configured similarly as first transportable device 311.

Reactor bay 50 may be configured as essentially a square or rectangular area comprising a width 376. Additionally, reactor module 100 may comprise a width 372, which may be approximately equal to a diameter of containment vessel 10. Reactor bay 50 may provide a clearance distance 374 between one or more wall of the reactor bay 50 and the reactor module 100. In the retracted position of first transportable device 311 and/or second transportable device 312 (such as illustrated in FIG. 2), the distance between one or more monitoring devices 351, 352, 353, 354 and vessel 10 may be approximately equal to clearance distance 374. In some examples, the clearance distance 374 may equal several feet or several meters.

Although four monitoring devices are illustrated in FIG. 3, more or fewer monitoring devices are contemplated herein. In some examples, the number of monitoring devices may be selected according to a corresponding number of components and/or features which are being measured or monitored. For example, first monitoring device 351 may be configured to monitor the neutron flux associated with a first neutron source 301, second monitoring device 352 may be configured to monitor the neutron flux associated with a second neutron source 302, third monitoring device 353 may be configured to monitor the neutron flux associated with a third neutron source 303, and fourth monitoring device 354 may be configured to monitor the neutron flux associated with a fourth neutron source 304. In some examples, the plurality of monitoring devices may be equally spaced around the perimeter of containment vessel 10.

As a neutron source ages, the ability to generate neutrons may diminish over time such that the neutron flux during a reactor initialization may be greater than the neutron flux that is present when the reactor is restarted. The proximity or distance of the one or more monitoring devices to containment vessel 10 may be adjusted to accommodate any change or variation in strength of a neutron source. For example, one or more of the monitoring devices may be incrementally moved closer to containment vessel 10 over the life of the respective neutron source in order to adjust for the decreased neutron flux.

One or more of the monitoring devices may comprise near-field or wireless communication devices. In some examples, such as with transportable apparatus 311 oriented in the extended position, monitoring devices 351 and/or 352 may be positioned near enough to receive and or exchange information with another wireless device located within containment vessel 10. Positioning the monitoring devices 351, 352 near corresponding wireless communication devices within containment vessel 10 may reduce the likelihood of cross-talk and may also reduce the signal strength required for uninterrupted communication. Additionally, by using near-field and/or wireless communications, the number of penetrations in containment vessel 10 may be reduced or eliminated.

By selecting and/or sizing relatively low-powered neutron source(s) as the neutron source to be monitored, neutron cross-talk between monitoring devices may be further minimized and/or eliminated. This may result in more accurate neutron flux measurements at the one or more monitoring devices. In some examples involving a modular reactor design comprising a plurality of reactor modules, the strength of the neutron source and/or the relative position of the monitoring devices may similarly reduce cross-talk between adjacent reactor modules.

In still other examples, one or more monitoring devices 351, 352 may be configured to detect and/or communicate with a device located within containment vessel 10 via audible signals. An internal device may be configured to emit a sound or alert in response to detecting and/or otherwise experiencing a particular operating condition. The operating condition may comprise a coolant level, a coolant temperature, a coolant flow rate, a fuel temperature, a containment pressure, a chemical composition, the presence of a gas, other types of operating conditions, or any combination thereof.

In some examples, the internal communication device may be integrated with and/or otherwise coupled to a fuel rod for purposes of evaluating the integrity of the fuel. The internal device may be configured to emit a sound that is detectable by the one or more external monitoring devices 351, 352. The sound may indicate a particular operating condition of the fuel such as a fuel temperature. The internal device may comprise a piezoelectric device configured to emit a sound when the fuel temperature exceeds a predetermined threshold. The relative sound level and/or pitch may indicate different ranges of fuel temperature.

Transportable apparatus 311 and/or monitoring devices 351, 352 may be located or positioned at an approximate elevation of reactor core 30. Monitoring devices 351, 352 may be configured to detect neutrons generated at or near reactor core 30. In some examples, monitoring devices 351, 352 may be separated from the neutron source(s) and/or from reactor core 30 by a containment region located between containment vessel 10 and reactor vessel 20. Neutrons generated by and/or emitted from the neutron source(s) and/or from the reactor core 30 may pass through the containment region prior to being detected by monitoring devices 351, 352. Locating monitoring devices 351, 352 adjacent to containment vessel 10 may mitigate or eliminate the neutron moderating effects of the pool of water 55 which surrounds containment vessel 10.

In still other examples, monitoring devices 351, 352 may be configured to be physically coupled, attached, or plugged into one or more receiving devices associated with containment vessel 10. The receiving devices may comprise a socket or other type of connection which may be configured to provide an electrical connection with the monitoring device. Signals or other types of information may be transmitted to, or from, monitoring devices 351, 352 via the one or more receiving devices. For example, monitoring devices 351, 352 may be configured to receive information indicating the positions of one or more control rods within the reactor pressure vessel.

The receiving devices may be configured to detect the presence and/or insertion of at least a portion of the monitoring device to create the connection. The receiving device may comprise a fitting operable to secure the monitoring device in the connected position. In some examples, the receiving device may be configured to lock and/or release in response to detecting the presence of the monitoring device. Additionally, the receiving device may be configured to release the monitoring device in response to receiving a signal that transportable apparatus 311 is preparing to move and/or retract one or both of first arm 321 and second arm 322.

Figure 4:
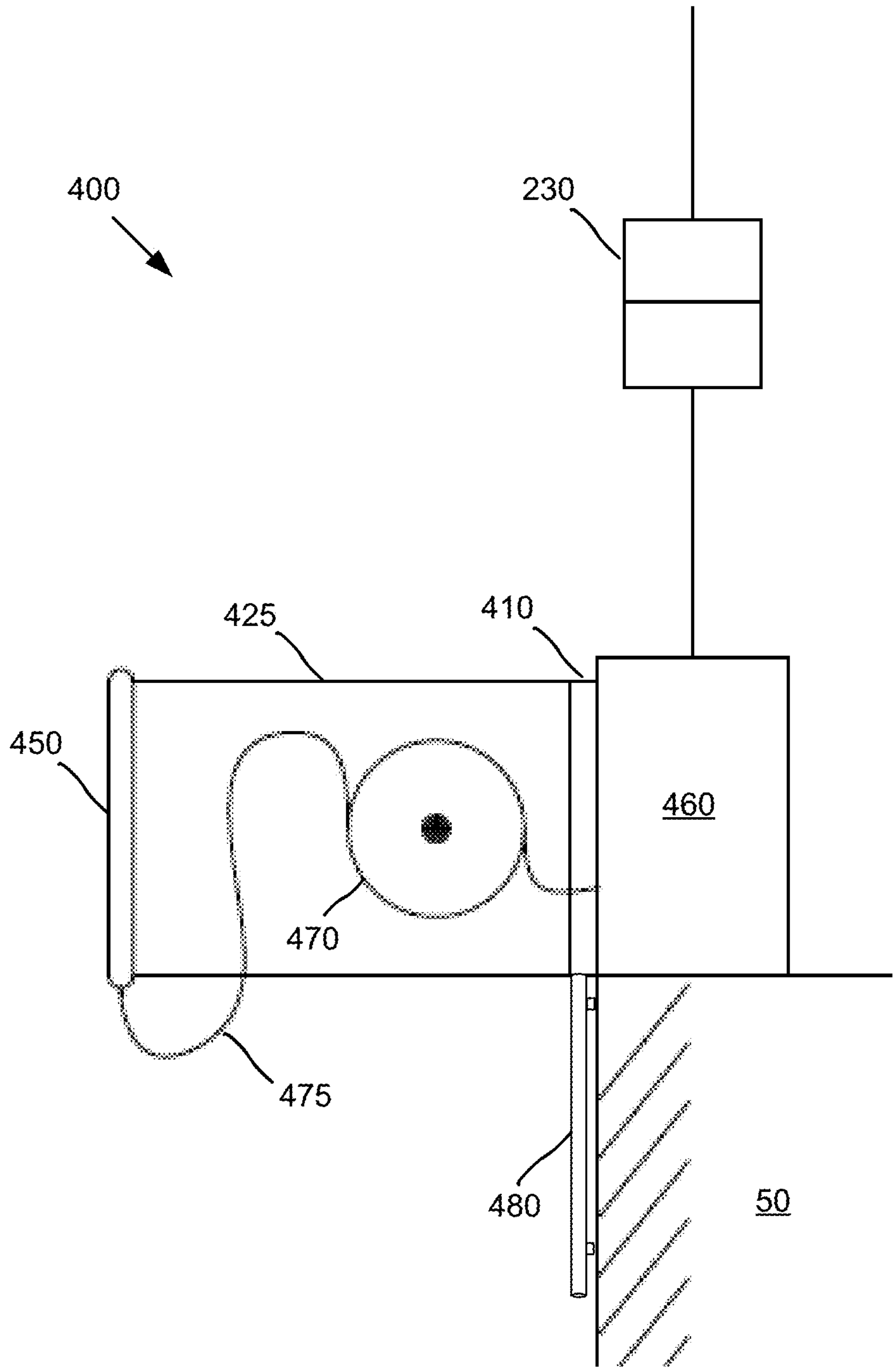
FIG. 4 illustrates a side view of an example system for monitoring a nuclear reactor module, shown in a raised position.

A spring force may be applied to first and second arms 321, 322 to move the monitoring devices 351, 352 towards containment vessel 10. Additionally, the spring force may exert a continuous force to maintain contact between monitoring devices 351, 352 and containment vessel 10 in the extended position FIG. 4 illustrates a side view of an example system 400 for monitoring a nuclear reactor module, shown in a raised position. System 400 may comprise one or more monitoring devices 450 mounted on the ends of one or more extendable arms 425. Extendable arm 425 may be pivotably attached to a hinged device 410. System 400 may be mounted to or located next to a wall of reactor bay 50. In some examples, in the raised position system 400 may be located at an elevation which is above the reactor bay 50, e.g., at the top of the wall. In addition to moving to an extended and retracted position, in some examples hinged device 410 may comprise a ball-joint or rotating joint that allow for rotational movement of the one or more monitoring devices 450 and/or extendable arms 425.

A hoisting device 460 may be configured to lift and lower system 400 out of and into, respectively, the reactor bay 50. Hoisting device 460 may comprise a track, a hoisting device, a winch, a pulley, a cable, a motor, one or more guide rails, wheels, or rollers, other transportation components, or any combination thereof. Additionally, hoisting device 460 may be configured to electrically and or communicatively couple monitoring device 450 with dry disconnect device 230. Hoisting device 460 may be configured so that it is readily removable, for example after system 400 has been raised out of reactor bay 50.

System 400 may comprise a spool 470 operable with a length of retractable cable 475. Cable 475 may comprise, or be co-located with, one or more mediums which may be configured to provide electricity to, and/or receive communication signals from, monitoring device 450. In some examples, system 400 may comprise a self-powered transport apparatus operable with a track, a hoisting device, a winch, a pulley, a cable, a motor, one or more guide rails, wheels, or rollers, other transportation components, or any combination thereof. A track system 480 is illustrated as being attached to a wall of reactor bay 50. In some examples, track system 480 may comprise one or more vertical and/or horizontal sections of track that enable monitoring device 450 to be guided about one or more walls of reactor bay 50. Hinged device 410 may be configured to run along track system 480. Additionally, a motor may be configured to control movement of hinged device in the horizontal and/or vertical directions along the one or more walls of reactor bay 50.

In some examples cable 475 may comprise a continuous cable that connects monitoring device 450 to hoisting device 460 and/or to dry disconnect apparatus 230. Using a continuous length cable may reduce the amount of electrical and/or signal interference associated with multiple connections, and also may reduce or eliminate the number of connections that are submerged in water, e.g., that may be stored in reactor bay 50. Cable 475 may be permanently attached to monitoring device 450 within a non-disconnect, water-tight, sealed casing. The casing may comprise a molded plastic or rubberized sealant that is formed at the connection during manufacture so as to remove any potential leak points. In some examples, cable 475 may be attached to monitoring device 450 at an internal sealed location within extendable arm 425. Additionally, by being able to readily relocate system 400 out of reactor bay 50, monitoring device 450 may be calibrated and/or have maintenance performed thereon in a dry environment.

Figure 5:
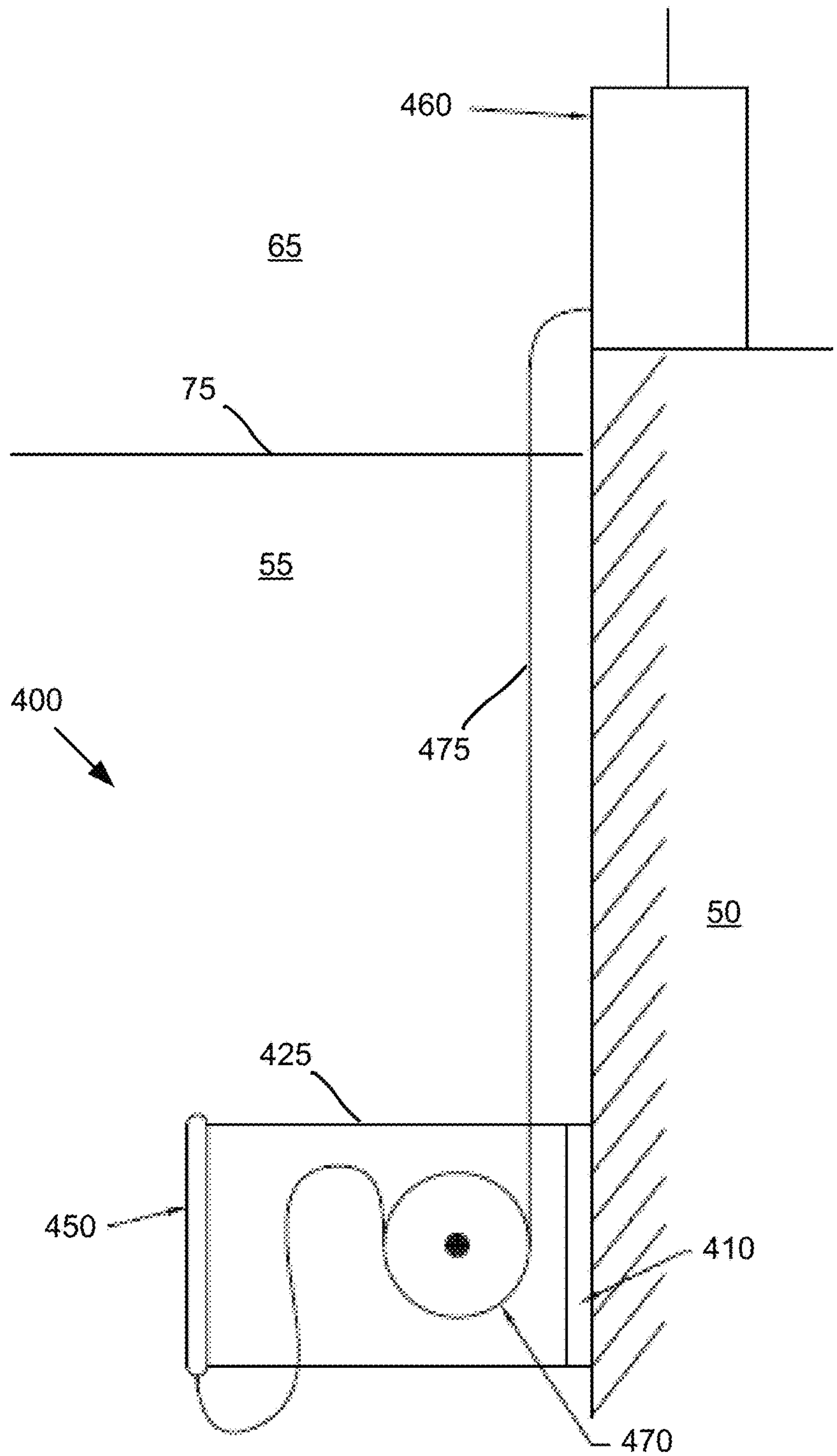
FIG. 5 illustrates the example system of FIG. 4, shown in a lowered position.

FIG. 5 illustrates the example system 400 of FIG. 4, shown in a lowered position within reactor bay 50. In some examples, in the lowered position system 400 may be substantially submerged in the pool of water 55 while hoisting device 460 and/or dry disconnect device 230 (FIG. 4) remain above the pool of water 55. Accordingly, system 400 may be lowered down into reactor bay 50 below a water line 75, such that system 400 is submerged under water. Conversely, system 400 may be raised out of reactor bay above water line 75, such that system 400 may be selectively exposed to air 65 and/or otherwise positioned in a dry location.

Cable spool 470, in conjunction with hoisting device 460, may be configured to retract and/or extend a length of cable 475 as system 400 is lowered into or lifted out of reactor bay 50. Extendable arm 425 may be extended after monitoring device 450 has been submerged in the pool of water 55. Similarly, monitoring device 450 may be activated after extendable arm 425 has been extended, e.g., towards a reactor module located within reactor bay 50. Additionally, extendable arm 425 may be retracted prior to raising system 400 out of the pool of water 55. In some examples, extendable arm 425 may be located in the retracted position anytime that system 400 is either being raised or lowered. Furthermore, hinged device 410 and/or hoisting device 460 may be configured to restrict and/or prohibit any vertical movement of system 400 when monitoring device 450 and/or extendable arm 425 is in the extended or active position.

Figure 6:
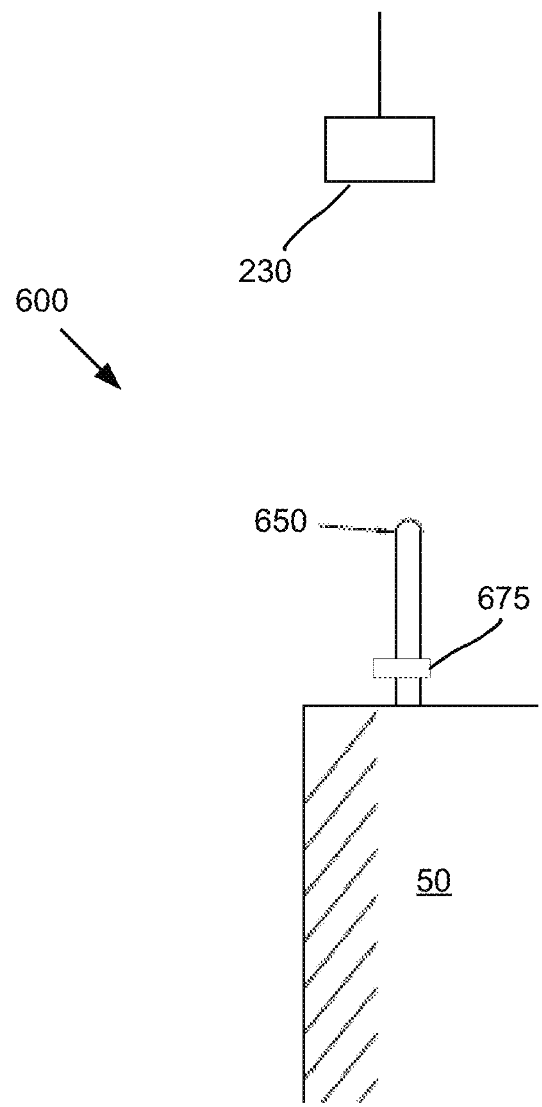
FIG. 6 illustrates an example mounting structure for a system for monitoring a nuclear reactor module.

FIG. 6 illustrates an example mounting structure 600 for a monitoring system. Mounting structure 600 may comprise a guide pin 650 and a locking mechanism 675. Guide pin 650 may be mounted on a wall of reactor bay 50. Additionally, guide pin 650 may be configured to insert within a hoisting device, such as hoisting device 460 (FIG. 4). Locking mechanism 675 may be configured to secure the hoisting device on to guide pin 650 so that the hoisting device is not inadvertently dislodged from guide pint 650 during operation of the hoisting device.

Dry disconnect apparatus 230 is shown for reference, in a disconnected state. That is, the portion of dry disconnect apparatus 230 is shown without being connected and/or mated to a connection device that may be associated with a hoisting device. In some examples, the hoisting device may be removed from mounting structure 600 by disconnecting the hoisting device from dry disconnect apparatus 230, releasing locking mechanism 675, and/or disconnecting the hoisting device from a transportable monitoring system.

Figure 7:
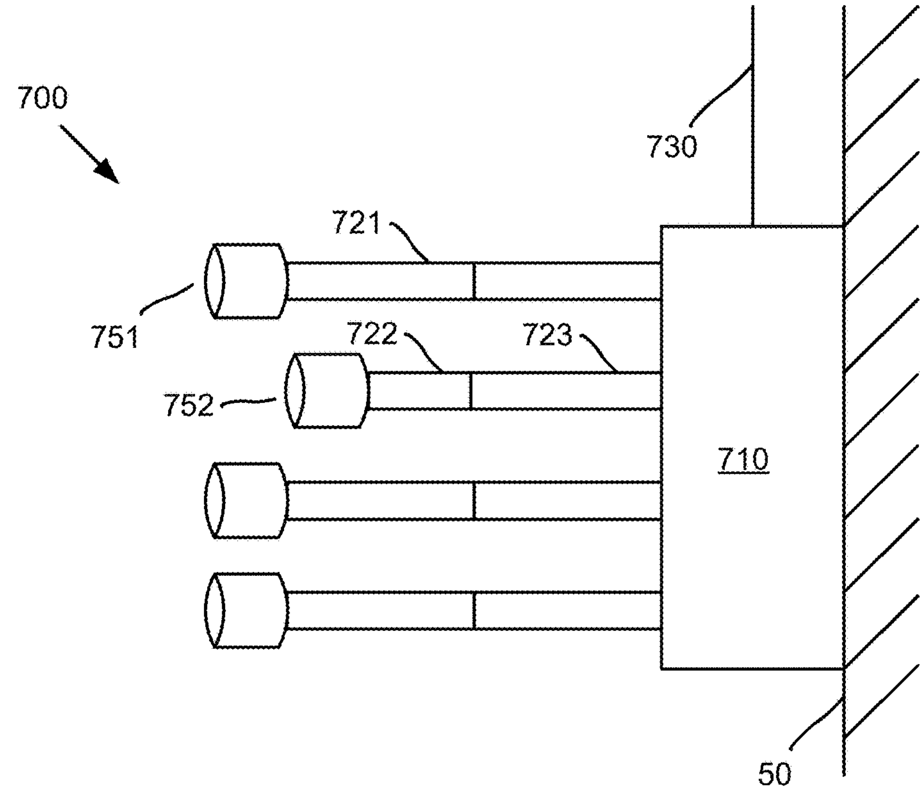
FIG. 7 illustrates a side view of an example system for monitoring a nuclear reactor module comprising multiple monitoring devices mounted on a transportable apparatus.

FIG. 7 illustrates a side view of an example system 700 for monitoring a nuclear reactor module comprising multiple monitoring devices mounted on a transportable apparatus 710. The multiple monitoring devices may comprise a first monitoring device 751 mounted on a first arm 721 and a second monitoring device 752 mounted on a second arm 722. Transportable apparatus 710 may be attached to a cable 730 and/or other device configured to lower or raise transportable apparatus 710 into reactor bay 50.

Transportable apparatus 710 may comprise a hinge, a pivot, a joint, a gate, a swivel, other types of connections, or any combination thereof. One or both of first arm 721 and second arm 722 may be extended, retracted, rotated, pivoted, articulated, repositioned, lowered, raised, and/or otherwise moved to position first monitoring device 721 and second monitoring device 722, respectively. First arm 721 may be moved independently of second arm 722. Additionally, first monitoring device 721 may be extended further from the wall of reactor bay 50 than second monitoring device 722.

In some examples, two or more sets of arms, may be connected to transportable apparatus 710. For example, a first set of arms and a second set of arms may be positioned on either side of transportable apparatus 710, similarly as first arm 321 and second arm 322, respectively, are shown on opposite sides of first transportable apparatus 311 in FIG. 3.

One or more of the multiple monitoring devices may be mounted on a telescoping arm. For example, second arm 722 may comprise multiple sections 723 which may be configured to telescope or retract into each other in order to extend and/or retract second monitoring device 752. A joint may be located intermediate the multiple sections of the arm to allow for a scissor-like motion of the arm. Additionally, one or more of the arms may comprise a pantograph mechanism for controlling a distance of the monitoring devices.

A surface of one or more of the monitoring devices may comprise a magnetic device. For example, the end of first monitoring device 751 may comprise a magnetic device configured to providing an attachment force to a metallic surface of the containment vessel. The magnetic device may be configured to maintain contact between first monitoring device 750 and the containment vessel in the event of any relative movement or vibration of the containment vessel or first arm 721 that might otherwise temporarily cause first monitoring device 750 to become temporarily dislodged from the surface of the containment vessel. The magnetic device may be configured to supply a magnetic or electromagnetic force that may be alternately turned on and turned off for attachment and separation, respectively, of the monitoring device to/from the containment vessel.

Figure 8:
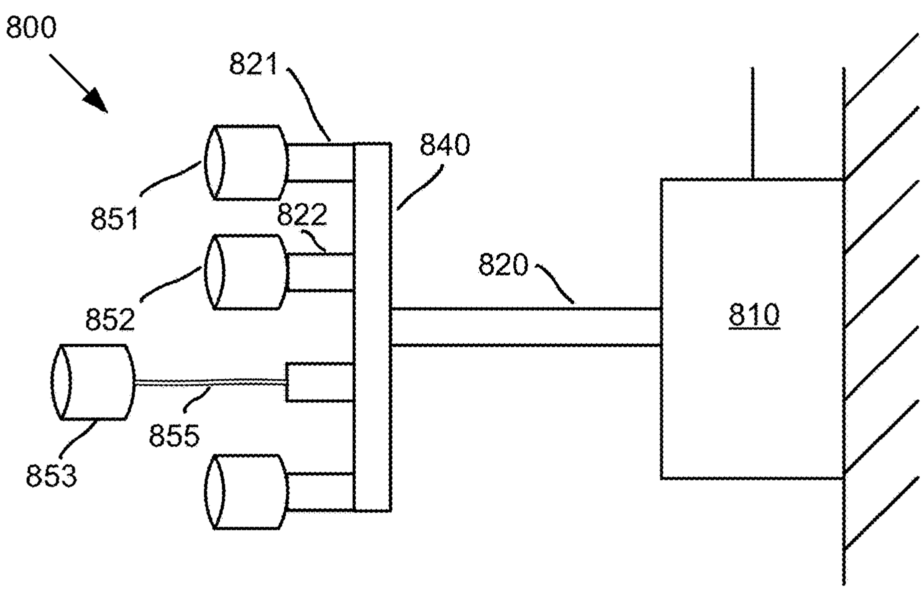
FIG. 8 illustrates a side view of a further example system for monitoring a nuclear reactor module comprising multiple monitoring devices mounted on a transportable apparatus.

FIG. 8 illustrates a side view of a further example system 800 for monitoring a nuclear reactor module comprising multiple monitoring devices mounted on a transportable apparatus 810. The multiple monitoring devices may comprise a first monitoring device 851 mounted on a first arm 821 and a second monitoring device 852 mounted on a second arm 822. Additionally, first arm 821 and second arm 822 may be connected to a main arm 820 by connection device 840. In some examples, connection device 840 may comprise one or more hinges, pivots, joints, gates, swivels, other types of connections, or any combination thereof, to allow for movement of first arm 821 and second arm 822. In some examples, first arm 821 may be configured to independent movement from second arm 822.

Additionally, transportable apparatus 810 may comprise a hinge, a pivot, a joint, a gate, a swivel, other types of connections, or any combination thereof, to provide for extension and/or retraction of main arm 820. In some examples, two or more main arms, similar to main arm 820, may be connected to transportable apparatus 810. For example, two main arms may be positioned similarly as first arm 321 and second arm 322 of FIG. 3.

One or more of the monitoring devices, such as a third monitoring device 853, may be self-propelled and/or self-guided. In some examples, monitoring device 853 may comprise a detachable robotic navigation device that may be tethered 855 to connection device 840 or transportable apparatus 810. The tether 855 may be used to retract monitoring device 853 after a monitoring operation has been completed.

Figure 9:
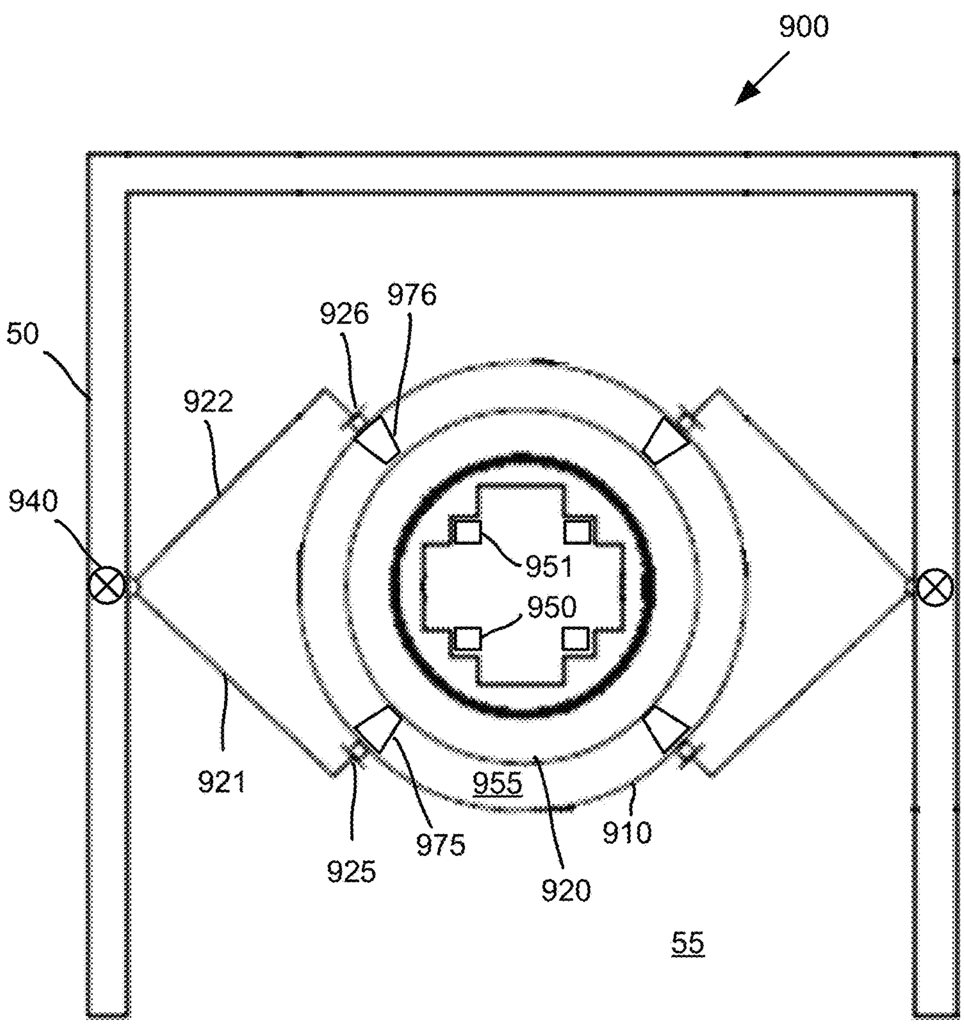
FIG. 9 illustrates an example system for monitoring a nuclear reactor module comprising one or more signal path devices.

FIG. 9 illustrates yet a further example monitoring system 900 comprising one or more signal path devices, such as signal path device 975. Signal path device 975 may be configured to enhance, augment, multiply, and/or otherwise increase a signal that may be detected at a monitoring device 925. In some examples, monitoring device 925 may be configured as a neutron detection device. Additionally, signal path device 975 may be configured as a neutron path device, as described in further detail by U.S. application Ser. No. 14/242,677, which is incorporated by reference herein.

Signal path device 975 may comprise a box, tube, pipe, and/or other type of container filled with a gas and/or partial vacuum. In some examples, signal path device 975 may be completely evacuated, or may comprise a substantially complete vacuum. In other examples, signal path device 975 may be a substantially solid object constructed of and/or comprising stainless steel, carbon steel, Zirconium, Zircaloy, other types of materials or composites, or any combination thereof.

Two or more signal path devices may be associated with two or more other monitoring devices. For example, a second signal path device 976 may be associated with a second monitoring device 926. Signal path device 975 may be located between a neutron source 950 and monitoring device 925. Similarly, second signal path device 976 may be located between a second neutron source 951 and second monitoring device 926.

Signal path device 975 may be located in an annular space 955 located between a reactor vessel 920 and a containment vessel 910. Additionally, containment vessel 910 may be at least partially surrounded in the pool of water 55 of reactor bay 50. Signal path device 975 may comprise a material that is a weaker attenuator of neutrons as compared to a medium found in annular space 955 and/or as compared to the pool of water 55.

Signal path device 975 may be mounted, attached, or located adjacent to an outer wall of reactor vessel 920 and/or to an inner wall of a containment vessel 910. For example, signal path device 975 is illustrated as being located between and/or intermediate to reactor vessel 920 and containment vessel 910. In some examples, signal path device 975 may be welded to containment vessel 910 and a gap or space may be maintained between signal path device 975 and reactor vessel 920. The gap may be configured to allow for thermal expansion of signal path device 975, reactor vessel 920, and/or containment vessel 910 during operation of the reactor module.

Signal path device 975 may be located substantially within annular space 955. In some examples, signal path device 975 may be located entirely within annular space 955, intermediate reactor vessel 920 and containment vessel 910. Signal path device 975 may provide a neutron attenuation path from neutron source 950 through one or both of reactor vessel 920 and containment vessel 910 prior to being detected by monitoring device 925.

In some examples, signal path device 975 may be configured to penetrate one or both of reactor vessel 920 and containment vessel 910 to provide a more direct path between neutron source 950 and monitoring device 925. By penetrating into and/or through one or both vessels 910, 920, the attenuating effects of the vessel walls may be reduced and/or eliminated, thus allowing for more of the neutrons being emitted from neutron source 950 to arrive at and/or be detected by monitoring device 925.

During a first mode of operation, annular space 955 may substantially comprise a first, or uniform medium. For example, during normal operation of a reactor module, the medium may comprise air or other types of gas maintained at a partial vacuum. In some examples, the first medium initially contained within annular space 955 may have substantially similar neutron attenuation characteristics as the material and/or medium contained in signal path device 975. Neutrons which are emitted from neutron source 950 may therefore be propagated through signal path device 975 in a similar manner as other neutrons which are propagated through the first medium which is initially contained within annular space 955.

During a second mode of operation, annular space 955 may comprise a second medium in addition to, or in place of, the first medium. For example, during an emergency mode of operation, such as an over-pressurization or high temperature incident, the reactor vessel 920 may be configured to release vapor, steam, and/or water into annular space 955. In some examples, the second medium may comprise and/or may include substantially similar neutron attenuation characteristics as coolant contained in reactor vessel 920. The neutron attenuation coefficient associated with signal path device 975 may be smaller than the neutron attenuation coefficient associated with the second medium. The relative size and/or value of the neutron attenuation coefficient may be used to determine the overall propensity of the particular medium to scatter and/or absorb neutrons.

The pressure in annular space 955 may increase due to released steam, gas, liquid, vapor, and/or coolant, resulting in a greater than atmospheric pressure condition with annular space 955. In some examples, a condensation of steam and/or liquid released by the reactor vessel may cause a fluid level within annular space 955 to rise. The second medium may substantially surround signal path device 975, or at least about the sides of signal path device 975, during the second mode of operation.

Signal path device 975 may be sealed. For example, signal path device 975 may be sealed in order to maintain a partial and/or complete vacuum. Under one or both of the first and second operating conditions, signal path device 975 may remain sealed such that the first medium and/or the second medium are not allowed to enter signal path device 975. Similarly, signal path device 975 may be configured to maintain a partial and/or a complete vacuum within signal path device 975 during one or both of the first and second operating conditions.

By maintaining a neutron attenuation path with a substantially consistent neutron attenuation characteristics under multiple modes of reactor operation, neutron source 950 and/or signal path device 975 may be configured to provide a substantially continuous, reliable, and/or uniform level of neutron flux to monitoring device 925 regardless of the operating condition and/or regardless of the surrounding medium within annular space 955. Accordingly, neutron source 950 may be selected and/or sized to provide a sufficient number of neutrons that may be detected by monitoring device 925 through signal path device 975.

By utilizing a medium and/or evacuated state for a neutron attenuation path which minimizes the amount of neutron attenuation, a smaller and/or less expensive neutron source may be selected. For example, a relatively low power neutron source may continue to generate a sufficient number of neutrons that may be detected by monitoring device 925 under any operating condition of the reactor. Additionally, by selecting and/or sizing neutron source 950 as a relatively low-powered neutron source, neutron cross-talk between adjacent reactor modules and their respective nuclear detectors, such as in a modular reactor design comprising a plurality of reactor modules, may be minimized and/or eliminated, which may result in more accurate neutron flux measurements at each neutron detector.

An actuation device 940 may be configured to position monitoring devices 975, 976. For example, actuation device 940 may be configured to extend and/or retract one or more arms, such as a first arm 921 operably coupled to monitoring device 925 and a second arm 922 operably coupled to second monitoring device 926. First and second arms 921, 922 may be actuated by electronic, hydraulic, magnetic, mechanical, or other means. In some examples, actuation device 940 may comprise a manually rotatable wheel configured to move the first and second arms 921, 922 via a mechanical linkage and/or gear system. A manually actuated system may obviate the need for any electrical power to position the monitoring device(s).

Figure 10:
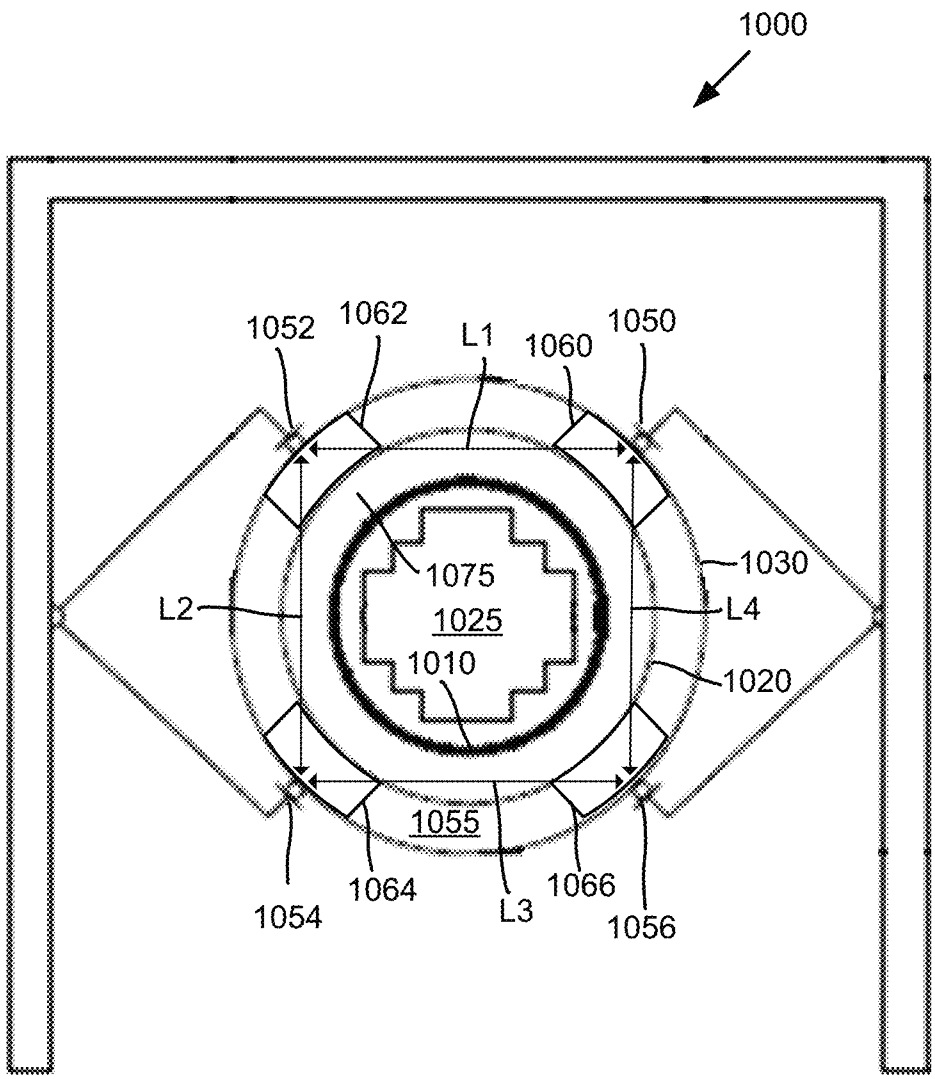
FIG. 10 illustrates yet another example system for monitoring a nuclear reactor module.

FIG. 10 illustrates yet another example system 1000 for monitoring a nuclear reactor module. In some examples, FIG. 10 may be understood as providing a top view of an example system for measuring flow rate through an annular volume 1075. The annular volume 1075 may be formed between a riser 1010 and a reactor pressure vessel 1020 of a reactor module. In some examples, riser 1010 may be associated with a radius that is approximately two-thirds of the radius associated with the reactor pressure vessel 1020.

System 1000 may comprise one or more monitoring devices, such as a first monitoring device 1050, a second monitoring device 1052, a third monitoring device 1054, and a fourth monitoring device 1056. The one or more monitoring devices may comprise a transponder. In some examples, the one or more monitoring devices may each comprise an emitting device and a receiving device. The one or more monitoring devices may be configured similarly as the emitters and receivers as described in U.S. Provisional Application No. 62/021,627.

Distances L1, L2, L3, and L4 represent line-of-sight paths and/or signal paths between the one or more monitoring devices. Additionally, the one or more monitoring devices may be located at different vertical elevations. In some examples, the line-of-sight paths may be associated with an emitter and a corresponding receiver located at a different, such as lower, elevation than the emitter.

The one or more monitoring devices may be externally located to an outer surface of containment vessel 1030 of a nuclear reactor module without requiring any physical penetrations through the containment vessel 1030. In some examples, each monitoring device may be positioned at a unique elevation along a flow path of fluid coolant that travels downward between reactor pressure vessel 1020 and riser 1010. One or more of the monitoring devices may be configured to transmit, retransmit, convey and/or propagate an acoustic signal. By locating the one or more monitoring devices on the containment vessel 1030, they do not impede the flow of coolant within the reactor vessel 1020.

System 1000 may comprise one or more signal path devices, such as such as a first signal path device 1060, a second signal path device 1062, a third signal path device 1064, and a fourth signal path device 1066. The one or more signal path devices may be configured to enhance, augment, multiply, and/or otherwise increase a signal that may be detected at a corresponding monitoring device.

The one or more signal path devices may comprise a box, tube, pipe, and/or other type of container filled with a gas and/or partial vacuum. In some examples, the one or more one or more signal path devices may be completely evacuated, or may comprise a substantially complete vacuum. In other examples, the one or more signal path devices may be a substantially solid object comprising constructed of and/or comprise stainless steel, carbon steel, Zirconium, Zircaloy, other types of materials or composites, or any combination thereof.

In some examples, two or more signal path devices may be associated with a line-of-sight path between two or more monitoring devices. For example, first signal path device 1060 and second signal path device 1062 may form at least part of the line-of-sight path between first monitoring device 1050 and second monitoring device 1052. The one or more signal path devices may be located in an annular space 1055 between reactor pressure vessel 1020 and containment vessel 1030.

The acoustic signal transmitted along one or more of the line-of-sight paths L1, L2, L3, and/or L4 may comprise an ultrasonic signal having a frequency of between 20.0 kHz and 2.5 MHz, a sonic signal having a frequency of between 20 Hz and 20.0 kHz, an infrasound signal having a frequency of less than 20.0 kHz, other frequency ranges, or any combination thereof. In other examples, one or more of the monitoring devices may be configured to transmit, retransmit, convey and/or propagate vibratory signals, light signals, ultraviolet signals, microwave signals, x-ray signals, electrical signals, infrared signals, other types of signals, or any combination thereof. Additionally, one or more of the signals may be transmitted, retransmitted, conveyed and/or propagated through an intervening rigid medium, such as an external surface of the reactor vessel 1020, and through at least a portion of a fluid located within the annular volume 1075 located internal to the reactor vessel 1020.

By positioning two, three, four, or another number of monitoring devices at different elevations along the external surface of reactor vessel 1020, a longer effective signal path may be created. The effective signal path may comprise a plurality of signal paths as between one or more pairs of emitters and receivers. For example, the effective signal path may comprise signal paths associated with distances L1, L2, L3, and L4. Similarly, the length of the effective signal path may comprise a summation of the distances L1, L2, L3, and L4.

In some examples, a monitoring device, such as fourth monitoring device 1056, may be configured to receive a response signal in response to a monitoring device, such as first monitoring device 1050, having transmitted an initial signal into the fluid located within annular volume 1075. The initial signal may be transmitted by first monitoring device 1050 to second monitoring device 1052. In response, second monitoring device 1052 may be configured to transmit, retransmit, convey and/or propagate an intermediate signal to third monitoring device 1054.

The receipt of the initial signal may act as a trigger to transmit the intermediate signal. Similarly, additional intermediate signals may be transmitted, retransmitted, conveyed and/or propagated between other monitoring devices located around the containment vessel 1030 until the response signal is received by fourth monitoring device 1056. In some examples, one or more of the monitoring devices may be configured as signal repeaters, in which a signal is repeated, reflected, and/or bounced along the perimeter of containment vessel 1030, forming a signal loop of up to 360 degrees or more. The effective signal path may be initiated at a first rotational angle, and may conclude at a second rotational angle. In some examples, the second rotational angle approximately equals the first rotational angle, such that the effective signal path may completely surround riser 1010.

Figure 11:
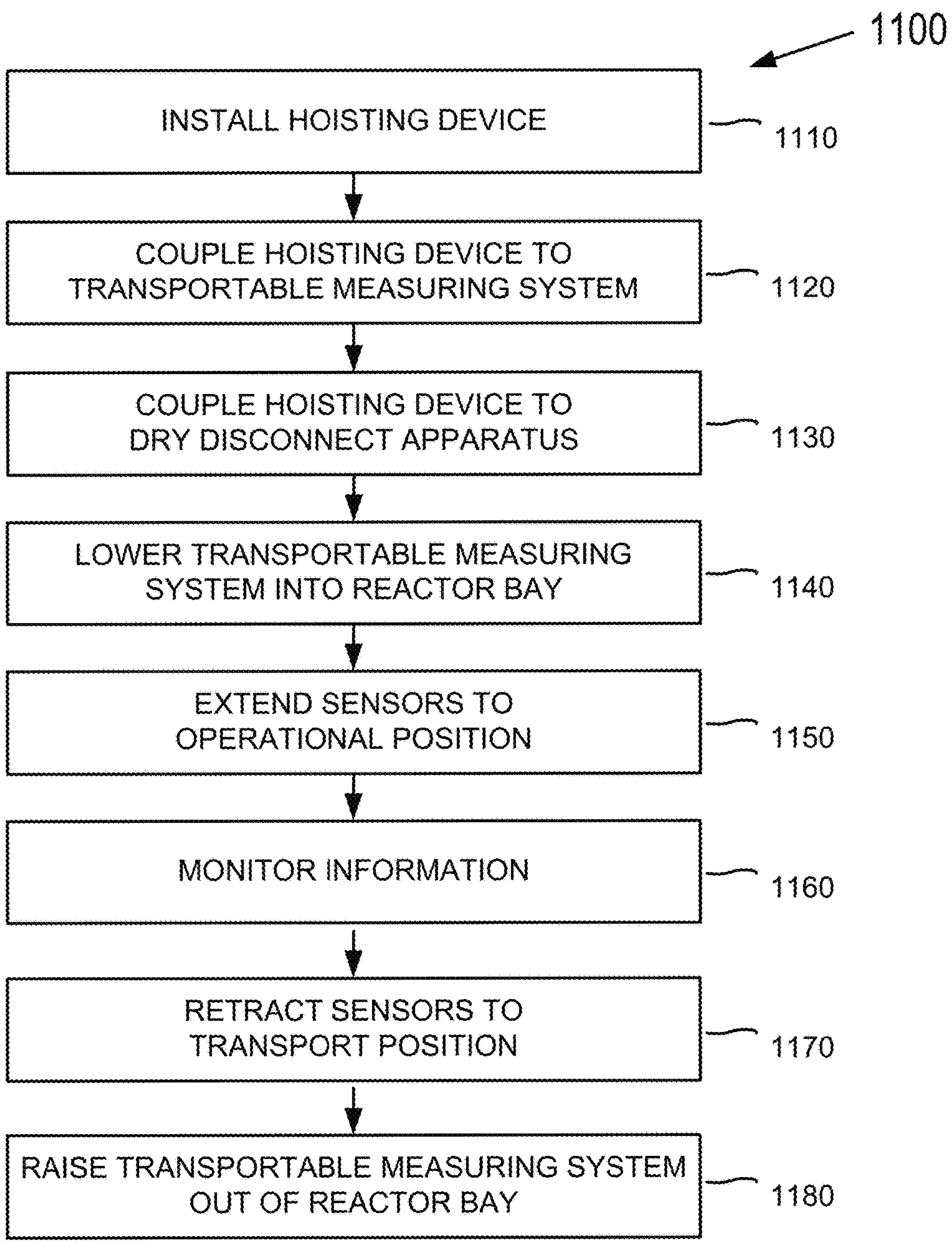
FIG. 11 illustrates an example process of monitoring a nuclear reactor module.

FIG. 11 illustrates an example process of monitoring a nuclear reactor module. At operation 1110, a hoisting device may be installed on a wall of a reactor bay. In some examples, the hoisting device may be installed on and secured to a guide pin mounted in the wall of the reactor bay.

At operation 1120, the hoisting device may be coupled to a transportable measuring system. In some examples, the hoisting device may be electrically coupled, communicatively coupled, and/or coupled by a cable to the transportable measuring system.

At operation 1130, the hoisting device may be coupled to a dry disconnect apparatus. In some examples, the hoisting device may be electrically coupled and/or communicatively coupled to the dry disconnect apparatus. In some examples, the dry disconnect apparatus may comprise a processing device and/or provide a communication link between a processing device or control panel and one or more one or more monitoring devices located on the transportable measuring system.

At operation 1140, the hosting device may be configured to lower the transportable measuring system into the reactor bay. The transportable measuring system may be lowered from an initial position above a pool of water, into a lowered position within the pool of water. The hoisting device and the dry disconnect apparatus may remain above the pool of water while the transportable measuring system is submerged in the pool of water. In some examples, the transportable measuring system may be lowered with the one or more monitoring devices located in a retracted transport position.

At operation 1150, the one or more monitoring devices may be extended from the retracted transport position to an extended operational position. In some examples, the extended operational position may comprise locating the one or more monitoring devices adjacent to or in contact with a containment vessel. The elevation of the one or more monitoring devices may be selected according to what is being measured. In addition to adjusting the elevation of the transportable measuring system to accommodate different measurements, the extended position of the one or more monitoring devices may also be adjusted.

At operation 1160, the one or more monitoring devices may measure, monitor, record, analyze, view, inspect, calculate, estimate, or otherwise determine one or more functions, characteristics, or other type of information associated with a reactor module. The information may be communicated to and/or through the dry disconnect apparatus. Additionally, the information may be processed by a processing device and/or displayed on a control panel.

At operation 1170, the one or more monitoring devices may be retracted to a transport position. The one or more monitoring devices may be retracted after the information has been obtained from the reactor module. Additionally, the one or more monitoring devices may be temporarily retracted or extended depending on information that may only be intermittently evaluated. The one or more monitoring devices may be located and/or stored in the retracted position when not in use, and then extended to the operational position for some predetermined period of time during a measurement operation. For example, the one or more monitoring devices may be extended prior to and during reactor initialization when neutron flux may be considerably low, and then the one or more monitoring devices may be retracted and/or stored during full power of the reactor module.

At operation 1180, the hosting device may be configured to raise the transportable measuring system out of the reactor bay. The transportable measuring system may be raised from the lowered position within the reactor bay to a raised position above the reactor bay. The transportable measuring system may be raised with the one or more monitoring devices located in a retracted transport position. In some examples, the transportable measuring system may be raised out of the reactor bay when the reactor module is being installed, refueled, moved, replaced, and/or having maintenance performed. In other examples, the transportable measuring system may be raised out of the reactor bay after a measuring operation has been completed.

Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Additionally, while various examples described lowering the transportable measuring system into a pool of water, the system will work equally well in the absence of water. For example, the transportable measuring system may also be lowered into a substantially dry reactor bay or containment building, and operate in air or an otherwise gaseous environment, or in a containment structure that is partially or completely evacuated.

Having described and illustrated various examples herein, it should be apparent that other examples may be modified in arrangement and detail. We claim all modifications and variations coming within the spirit and scope of the following claims.

The invention claimed is:

1. A nuclear reactor module monitoring system, comprising:

a reactor module housed in a reactor bay;

multiple monitoring devices configured to monitor the reactor module; and a transportable mounting structure attached to a wall of the reactor bay, the transportable mounting structure including:

an attachment structure configured to move the transportable mounting structure along the wall of the reactor bay;

a hinge connected to the transportable mounting structure;

two horizontally elongated arms each attached at a first end to the hinge and extending radially out from the hinge in oppositely inclining angles, and each attached at a second end to different ones of the monitoring devices, the two arms configured to both:

rotate about the hinge into an extended position and move the attached monitoring devices out away from the wall of the reactor bay towards an exterior surface of the reactor module in preparation for a monitoring operation; and rotate about the hinge into a retracted position and move the monitoring devices away from the exterior surface of the reactor module back towards the wall of the reactor bay upon completion of the monitoring operation.

2. The nuclear reactor module monitoring system of claim 1, further comprising a hoisting device attached to the wall of the reactor bay, wherein the hoisting device is configured to lower the transportable mounting structure into the reactor bay, and wherein a cable that is at least partially lowered into the reactor bay with the transportable mounting structure is configured to convey information from at least one of the monitoring devices to a processing device located external to the reactor bay.

3. The nuclear reactor module monitoring system of claim 2, wherein the reactor bay comprises a pool of water that at least partially surrounds the reactor module, wherein the hoisting device is configured to lower the transportable mounting structure into the pool of water, and wherein the cable is communicatively coupled to a dry disconnect apparatus located outside of the pool of water.

4. The nuclear reactor module monitoring system of claim 1, wherein the two arms are configured to rotate at the same time in opposite directions about the hinge to position the monitoring devices towards the exterior surface of the reactor module.

5. The nuclear reactor module monitoring system of claim 1, wherein one or more of the monitoring devices comprise one or more neutron monitoring devices, respectively, each neutron monitoring device configured to monitor a neutron flux generated within the reactor module.

6. The nuclear reactor module monitoring system of claim 5, wherein the arms are configured to position the one or more neutron monitoring devices next to a containment vessel of the reactor module that is at least partially submerged in a pool of water contained in the reactor bay, and wherein the one or more neutron monitoring devices are configured to monitor the neutron flux that exits the containment vessel while the one or more neutron monitoring devices are submerged in the pool of water.

7. The nuclear reactor module monitoring system of claim 1, including:

an additional transportable mounting structure mounted on an opposite wall of the reactor bay;

an additional hinge connected to the additional transportable mounting structure; and an additional pair of horizontally elongated arms each attached at a first end to the additional hinge and extending radially out from the additional hinge in oppositely inclining angles, and each attached at a second end to different ones of the monitoring devices, the additional pair of arms configured to both:

rotate about the additional hinge into an extended position and move the attached monitoring devices out away from the opposite wall of the reactor bay towards the exterior surface of the reactor module in preparation for a monitoring operation; and rotate about the additional hinge into a retracted position and move the attached monitoring devices away from the exterior surface of the reactor module towards the opposite wall of the reactor bay upon completion of the monitoring operation.

8. The nuclear reactor module monitoring system of claim 1, wherein the reactor module comprises a containment vessel at least partially submerged in a pool of water housed within the reactor bay, and wherein the monitoring devices are configured to magnetically attach to the containment vessel within the pool of water.

9. The nuclear reactor module monitoring system of claim 1, wherein the reactor module comprises a containment vessel housed, at least partially, within the reactor bay, and wherein the nuclear reactor module monitoring system further comprises a release mechanism located next to the containment vessel configured to provide an electrical connection with at least one of the monitoring devices.

10. The nuclear reactor module monitoring system of claim 1, wherein the reactor module comprises a containment vessel housed, at least partially, within the reactor bay.

11. The nuclear reactor module monitoring system of claim 10, further comprising a hoisting device attached to the wall of the reactor bay, wherein the hoisting device is configured to raise the transportable mounting structure out from the reactor bay while the arms remain in the retracted position.

12. The nuclear reactor module monitoring system of claim 1, further comprising a wireless transceiver associated with the monitoring devices, wherein the wireless transceiver is located outside of a containment vessel of the reactor module and is configured to receive wireless information transmitted from a communication device located within the containment vessel.

13. A nuclear reactor module monitoring system, comprising:

a reactor module housed in a reactor bay;

one or more monitoring devices for monitoring the reactor module during a monitoring operation; and a transportable mounting structure attached to a wall of the reactor bay, the transportable mounting structure including an attachment structure configured to move the transportable mounting structure along the wall of the reactor bay for retaining and positioning the monitoring devices next to the reactor module, a hinged device connected to the transportable mounting structure, and arms attached to the hinge device and holding the monitoring devices, wherein the transportable apparatuses are configured to:

rotate the arms about a same axis of the hinged device moving the arms from a retracted position near the wall of the reactor bay out away from the wall to an extended position where the monitoring devices are positioned near an external surface of the reactor module, wherein the monitoring devices are configured to monitor the reactor module when the arms are rotated into the extended position; and rotate the arms about the same axis and away from the external surface of the reactor module back into the retracted position near the wall of the reactor bay after completing the monitoring operation.

14. A method of monitoring a nuclear reactor module housed in a reactor bay, the method comprising:

providing a transportable monitoring structure including multiple monitoring devices for monitoring the reactor module, the transportable monitoring structure attached to a wall of the reactor bay, the transportable monitoring structure including:

an attachment structure configured to move the transportable monitoring structure along a wall of the reactor bay;

a hinged device connected to the transportable monitoring structure;

arms attached to the hinged device, the arms holding the multiple monitoring devices;

wherein the method further comprises:

rotating the arms from a retracted position located adjacent to the wall of the reactor bay to an extended position near the reactor module;

monitoring, with the monitoring devices, the reactor module during a monitoring operation while the arms are in the extended position; and rotating the arms away from the reactor module and back into the retracted position adjacent to the wall after completing the monitoring operation.

15. The method of claim 14, further comprising:

lowering the transportable monitoring structure into the reactor bay, wherein the transportable monitoring structure is lowered adjacent to the wall of the reactor bay and outside of the reactor module prior to extending the arms; and raising the transportable monitoring structure out of the reactor bay, wherein the transportable monitoring structure is raised out of the reactor bay while the arms remain in the retracted position.

16. The method of claim 14, wherein the monitoring devices comprise neutron monitoring devices configured to detect a neutron flux generated within the reactor module, wherein in the extended position of the arms, the one or more neutron monitoring devices are positioned next to a containment vessel of the reactor module that is at least partially submerged in a pool of water contained in the reactor bay, and wherein monitoring the reactor module comprises detecting the neutron flux that exits the containment vessel while the one or more neutron monitoring devices are submerged in the pool of water.

17. The method of claim 14, wherein the reactor module comprises a containment vessel housed, at least partially, within the reactor bay, and wherein the method further comprises:

securing the monitoring devices when the arms are in the extended position and the monitoring devices are next to the containment vessel while monitoring the reactor module; and releasing the monitoring devices after completion of the monitoring operation, wherein upon being released, the arms return to the retracted position.

18. The method of claim 17, the monitoring devices connect to the containment vessel when the arms are in the extended position.

* * * * *